United States Patent
Katayama et al.

(10) Patent No.: US 7,431,383 B2
(45) Date of Patent: Oct. 7, 2008

(54) CONSTRUCTION MACHINE AND METHOD FOR MANUFACTURING THE SAME

(75) Inventors: Naohiro Katayama, Hiroshima (JP); Takayuki Okunishi, Hiroshima (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 233 days.

(21) Appl. No.: 10/921,153

(22) Filed: Aug. 19, 2004

(65) Prior Publication Data
US 2005/0040211 A1 Feb. 24, 2005

(30) Foreign Application Priority Data
Aug. 21, 2003 (JP) ............... 2003-297094

(51) Int. Cl.
*B62D 33/06* (2006.01)
(52) U.S. Cl. .................... 296/190.08; 296/204
(58) Field of Classification Search ............ 296/190.01, 296/190.05, 190.08, 203.01, 204, 205, 190.04; 180/89.13, 311; 280/781; 228/164, 165
See application file for complete search history.

(56) References Cited

U.S. PATENT DOCUMENTS

| | | | | |
|---|---|---|---|---|
| 3,473,215 A | * | 10/1969 | Stevens | ............ 228/165 |
| 6,435,584 B1 | | 8/2002 | Bonnville | |
| 6,499,556 B1 | | 12/2002 | Koyama | |
| 6,640,517 B2 | * | 11/2003 | Mitchell | ............ 52/736.1 |
| 7,070,017 B2 | * | 7/2006 | Hoshi et al. | ............ 180/89.13 |
| 2006/0108171 A1 | * | 5/2006 | Koga et al. | ............ 180/327 |
| 2006/0226680 A1 | * | 10/2006 | Matsumoto et al. | ... 296/190.01 |

FOREIGN PATENT DOCUMENTS

| | | |
|---|---|---|
| EP | 1 447 310 A2 | 8/2004 |
| JP | 07-150589 | 6/1995 |
| JP | 10-292428 | 11/1998 |
| JP | 2002-146834 | 5/2002 |
| JP | 2003-020683 | 1/2003 |
| JP | 2003-336286 | 11/2003 |

\* cited by examiner

*Primary Examiner*—Jason S Morrow
(74) *Attorney, Agent, or Firm*—Oblon, Spivak, McClelland, Maier & Neustadt, P.C.

(57) ABSTRACT

A construction machine includes a lower traveling body on which an upper rotating body is rotatably disposed. The rotating body includes an upper frame provided with a bottom plate and a supporter acting as a perpendicular member. The bottom plate has an attachment hole extending substantially perpendicular to the bottom plate. The supporter is welded substantially perpendicular to the bottom plate while one end of the supporter is engaged with the attachment hole. Accordingly, the supporter can be easily fixed to the bottom plate while maintaining the perpendicularity and a proper height setting of the supporter.

2 Claims, 6 Drawing Sheets

CONSTRUCTION MACHINE AND METHOD FOR MANUFACTURING THE SAME

BACKGROUND OF THE INVENTION

1. Field of the Invention

The present invention relates to construction machines, such as hydraulic excavators, and to a method for manufacturing such construction machines.

2. Description of the Related Art

Hydraulic excavators are generally provided with an upper rotating body which includes a frame. The frame has a bottom plate which is provided with supporters for supporting devices, such as an operating oil tank and a fuel tank.

Conventionally, the supporters are attached to the bottom plate by welding the lower end of each supporter to the top surface of the bottom plate.

In such a case, since the supporters are attached to devices and guard panels, the supporters must be properly adjusted for height and perpendicularity.

However, when assembling together the main components of the rotating body, such as main frame components, there are cases where the bottom plate is bent due to welding distortion. Such bending of the bottom plate is large especially in cases where the thickness of the bottom plate is small with respect to the surface area.

Consequently, this means that the supporters have to be fixed to a slanted surface and thus may deteriorate the perpendicularity of the supporters, and moreover, may lead to improper height setting of the supporters. As a result, this may create difficulties in attaching the devices and the guard panel to the supporters.

Furthermore, other than the welding distortion, there are also cases where the deterioration of the perpendicularity and the improper height setting of the supporters are caused due to a fabrication error in the top surface of the bottom plate or a truncation error in the supporters.

For solving the problem of the welding distortion in the bottom plate, the bottom plate may be heated prior to attaching the supporters so as to fix the distortion. On the other hand, for solving the problem of the fabrication error in the bottom plate or the truncation error in the supporters, such an error in the bottom plate or the supporters may be corrected prior to the welding process by, for example, cutting. Such solutions are possible, but are problematic in view of the fact that they increase the time and number of steps required for manufacture.

SUMMARY OF THE INVENTION

Accordingly, it is an object of the present invention to provide a construction machine that enables a simple attachment process of perpendicular members, such as supporters, to a bottom plate of an upper frame while maintaining the perpendicularity and a proper height setting of each perpendicular member. Moreover, it is another object of the present invention to provide a method for manufacturing such a construction machine.

A construction machine according to the present invention includes a lower traveling body, and an upper rotating body rotatably disposed on the traveling body and including an upper frame. The upper frame includes a bottom plate and a perpendicular member. The bottom plate has at least one attachment hole which extends substantially perpendicular to the bottom plate. The perpendicular member is disposed on the bottom plate in such a manner that an end of the perpendicular member is welded substantially perpendicular to the bottom plate while being engaged with the attachment hole.

Accordingly, since each attachment hole extends substantially perpendicular to the bottom plate of the upper frame and the lower end of the perpendicular member is welded to the bottom plate while being engaged with the corresponding attachment hole, the perpendicularity of the perpendicular member can be ensured regardless of welding distortion or a fabrication error in the bottom plate, or a truncation error in the perpendicular member.

Furthermore, since the height of the perpendicular member can be adjusted within the engagement portion between the lower end of the perpendicular member and its corresponding attachment hole, an accurate height adjustment of the perpendicular member can be achieved.

Although the expression "at least one attachment hole which extends substantially perpendicular to the bottom plate" is being used above, each attachment hole does not necessarily have to be exactly perpendicular to the bottom plate. In detail, the perpendicularity of each attachment hole is permissible to an extent such that each attachment hole does not cause problems in attaching the devices to the supporters.

DESCRIPTION OF THE PREFERRED EMBODIMENTS

The connection structure for perpendicular members in a construction machine according to the present invention will now be described. The construction machine is provided with a lower traveling body on which an upper rotating body is disposed. The rotating body is provided with an upper frame which includes a bottom plate and perpendicular members. The perpendicular members are fixed to the bottom plate by welding such that the perpendicular members are substantially perpendicular to the bottom plate. Furthermore, attachment holes are provided in the bottom plate of the upper frame at positions corresponding to the perpendicular members such that each attachment hole extends substantially perpendicular to the bottom plate. Specifically, the lower end of each perpendicular member engages with the corresponding attachment hole, and the engagement portion between the two is welded so that the perpendicular member is fixed to the bottom plate.

Furthermore, according to a method for manufacturing a construction machine according to the present invention, the perpendicular members are fixed to the bottom plate. For fixing the perpendicular members to the bottom plate, the perpendicular members are welded to the bottom plate such that the perpendicular members are substantially perpendicular to the bottom plate. Specifically, the attachment holes are formed in the bottom plate of the upper frame at positions corresponding to the perpendicular members such that each attachment hole extends substantially perpendicular to the bottom plate. The lower end of each perpendicular member is inserted through the corresponding attachment hole and is engaged with the hole while the height and the perpendicularity of the perpendicular member are adjusted with respect to the bottom plate. In this state, the engagement portions between the perpendicular members and the attachment holes are welded so as to fix the perpendicular members to the bottom plate.

Accordingly, since each attachment hole extends substantially perpendicular to the bottom plate of the upper frame and the lower end of each perpendicular member is welded to the bottom plate while being engaged with the corresponding attachment hole, the perpendicularity of each perpendicular member can be ensured regardless of welding distortion or a fabrication error in the bottom plate, or a truncation error in the perpendicular members.

Furthermore, since the height of each perpendicular member can be adjusted within the engagement portion between the lower end of each perpendicular member and its corresponding attachment hole, an accurate height adjustment of each perpendicular member can be achieved.

Figure 8:
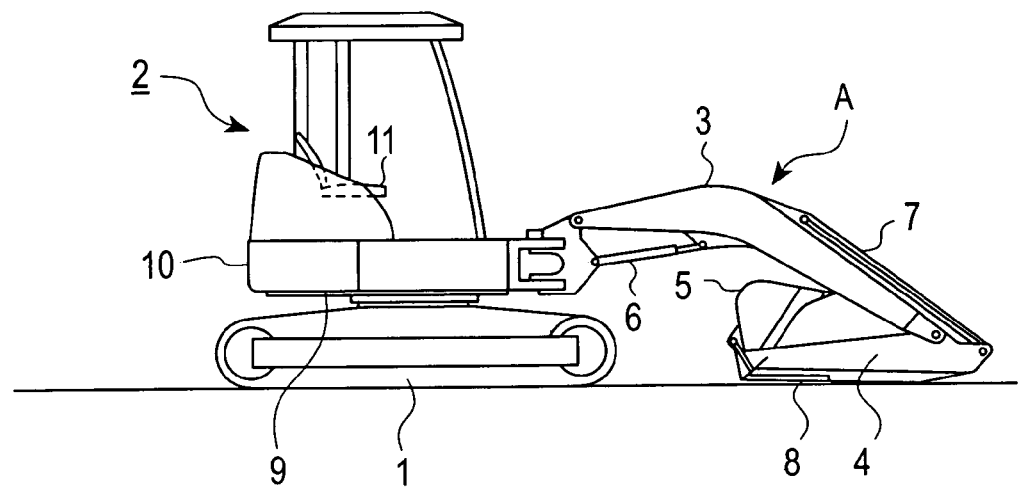
FIG. 8 is a side view of a hydraulic excavator in which the present invention is applied.

FIG. 8 illustrates a hydraulic excavator having a compact body, which is also known as a compact excavator. Such an excavator has a lower traveling body 1 on which an upper rotating body 2 is disposed, such that the rotating body 2 is capable of rotating around a vertical axis (rotational axis). The rotating body 2 is provided with an operating device A which includes a boom 3, an arm 4, and a bucket 5. Moreover, the operating device A further includes a boom cylinder 6, an arm cylinder 7, and a bucket cylinder 8 for driving the boom 3, the arm 4, and the bucket 5, respectively.

The rotating body 2 is further provided with an upper frame 9 on which devices, such as an engine; a guard panel 10 for covering such devices; and a driver seat 11 are disposed.

Figure 9:
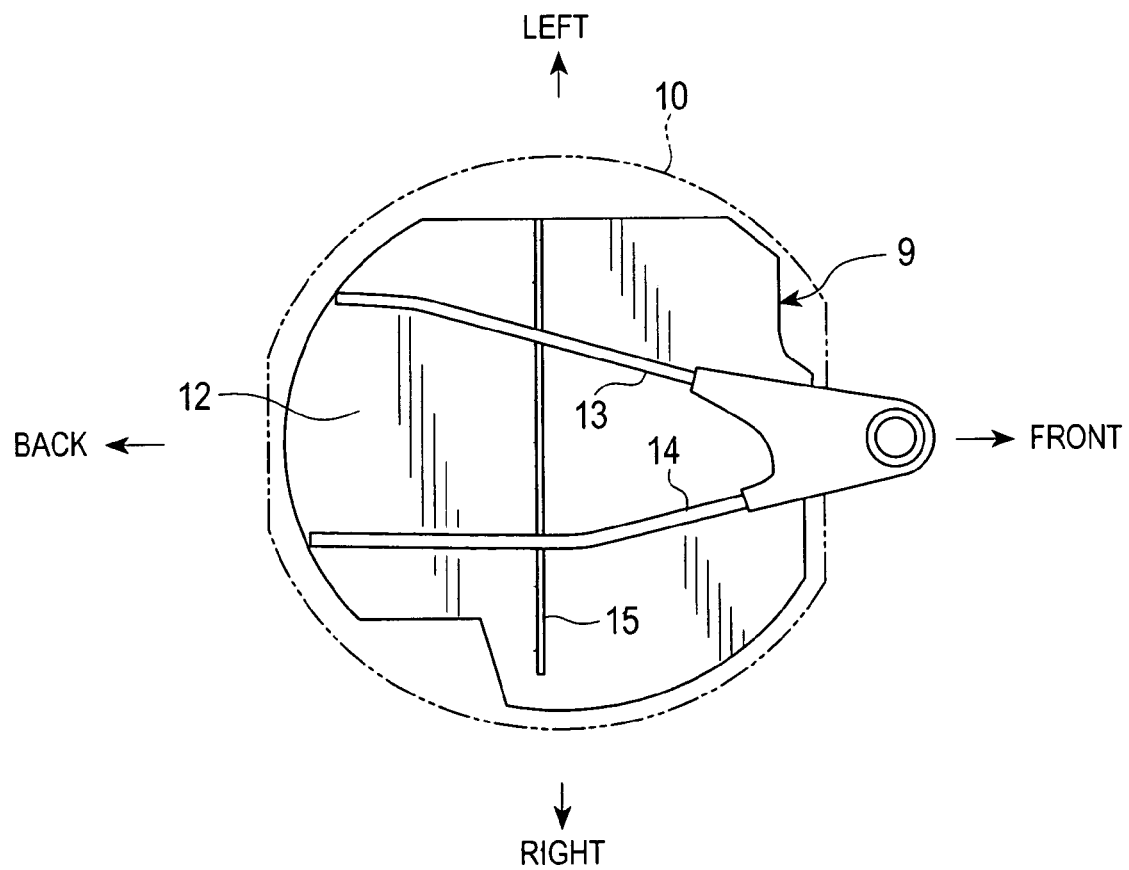
FIG. 9 is a schematic plan view of the upper frame included in an upper rotating body of the hydraulic excavator.
Figure 10:
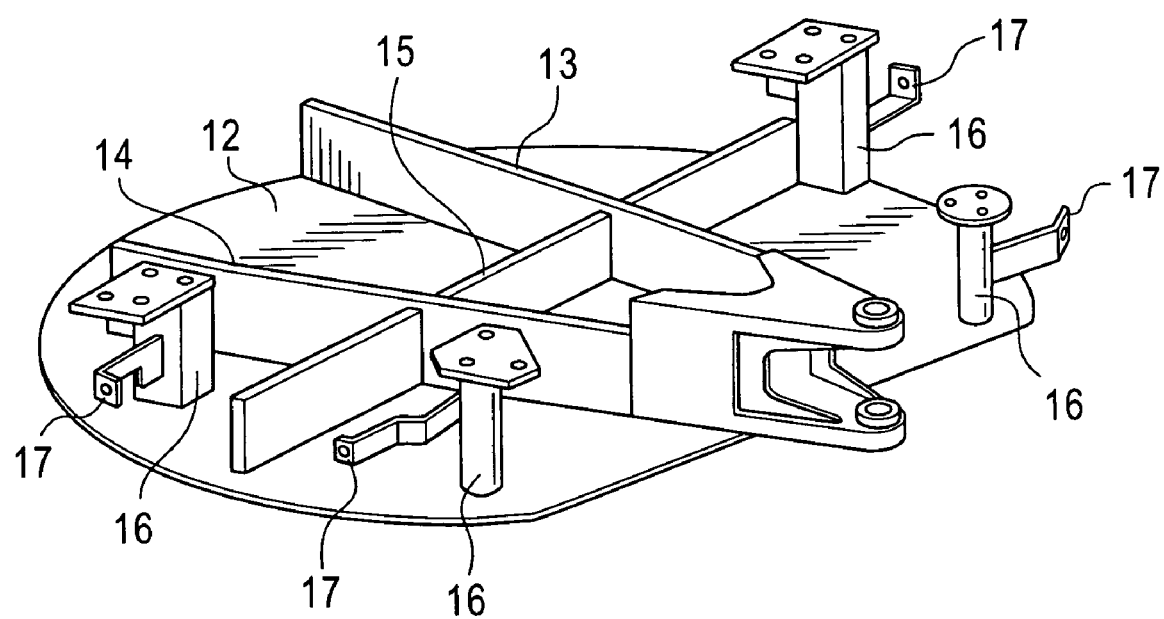
FIG. 10 is a perspective view of the upper frame.

FIGS. 9 and 10 illustrate the schematic structure of the upper frame 9.

Referring to FIGS. 9 and 10, the upper frame 9 is provided with a bottom plate 12. On the bottom plate 12, main frame components 13 and 14 and a partition wall 15 are disposed. Specifically, the main frame components 13 and 14, which are also known as longitudinal ribs, are walls extending from the front of the upper frame 9 to the back of the upper frame 9. The main frame components 13 and 14 are respectively provided along the left and right sides of the upper frame 9. Here, the terms "left", "right", "front" and "back" refer to directions of the upper frame 9 in a case where the upper frame 9 is viewed from a position of a driver seated in the driver seat 11. These terms will be used hereinafter as references for the directions. On the other hand, the partition wall 15 extends from left to right such that the partition wall 15 crosses the main frame components 13 and 14. The partition wall 15 thus separates the upper frame 9 into sections, one of which being a back section (an engine room) where a driving device such as an engine (not shown in the drawings) is disposed.

Referring to FIG. 10, the bottom plate 12 is provided with a plurality of supporters 16 extending perpendicular to the bottom plate 12 at different positions. An operating oil tank, a fuel tank, a battery, a control-valve block, a floor plate, and the like, which will be referred to as elements B, are attached to the corresponding supporters 16.

Furthermore, each of the supporters 16 has a guard-panel bracket 17 attached thereto. The guard panel 10 shown in FIGS. 8 and 9 is attached to these guard-panel brackets 17.

The supporters 16 are fixed to the bottom plate 12 by welding.

Using a hydraulic excavator as an example, embodiments of the present invention will now be described with reference to FIGS. 1 to 7.

In first to third embodiments according to the present invention, the supporters 16 function as the perpendicular members included in the upper frame 9, and are fixed to the bottom plate 12 such that the supporters 16 are disposed substantially perpendicular to the bottom plate 12. Furthermore, in a fourth embodiment of the present invention, plate members 19 having an oblong plate structure act as the perpendicular members.

First Embodiment (FIGS. 1 to 3D)

A first embodiment according to the present invention is an example in which the supporters 16 are fixed to the bottom plate 12 of the upper frame 9. As described above, the supporters 16, which are shown in FIG. 10, define the perpendicular members and are provided for holding each of the elements B.

Each of the supporters 16 is a circular or rectangular pipe having a length slightly greater than the predetermined height of the upper frame 9, and has the guard-panel bracket 17 attached to the outer periphery thereof.

Each supporter 16 is engaged with one of attachment holes 18 extending through the bottom plate 12. After the height adjustment of each supporter 16 is completed, the engagement portion between the supporter 16 and the corresponding attachment hole 18 at both sides of the bottom plate 12 is welded, and one of the elements B is then disposed on the upper end of the supporter 16.

The procedure for fixing one of the supporters 16 to the bottom plate 12 will now be described with reference to FIGS. 3A to 3D.

Figure 3A:
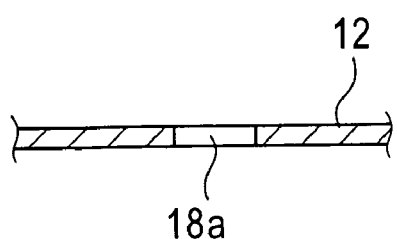
FIGS. 3A to 3D are diagrams each illustrating one of steps for fixing the supporter to the bottom plate.

First, as shown in FIG. 3A, by using, for example, a drill, a preliminary hole 18a is formed in the bottom plate 12 at a position where one of the supporters 16 is to be fixed to the bottom plate 12. The preliminary hole 18a is drilled perpendicular to the bottom plate 12 regardless of the out-of-levelness of the bottom plate 12 (which may be due to, for example, welding distortion or a fabrication error).

Figure 3B:
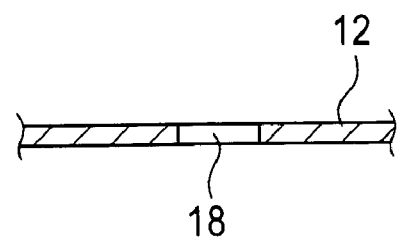

Subsequently, as shown in FIG. 3B, the inner periphery of the preliminary hole 18a is machined by milling (cutting) so that the inner periphery is completely perpendicular to the bottom plate 12. Consequently, this forms the attachment hole 18. Here, the machining technique is not limited to milling, and other techniques, such as laser machining, grinding, reaming, and broaching, may be used. Since each attachment hole 18 is formed by machining the inner periphery of the corresponding preliminary hole 18a formed in the bottom plate 12 such that the inner periphery is substantially perpendicular to the bottom plate 12, the perpendicularity of each supporter 16 acting as the perpendicular member is improved.

Figure 1:
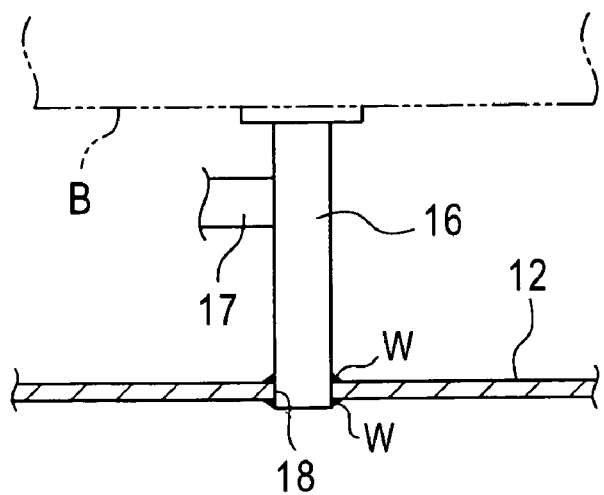
FIG. 1 is a cross-sectional view illustrating a state where one of supporters acting as a perpendicular member is fixed to a bottom plate of an upper frame according to a first embodiment of the present invention.
Figure 2:
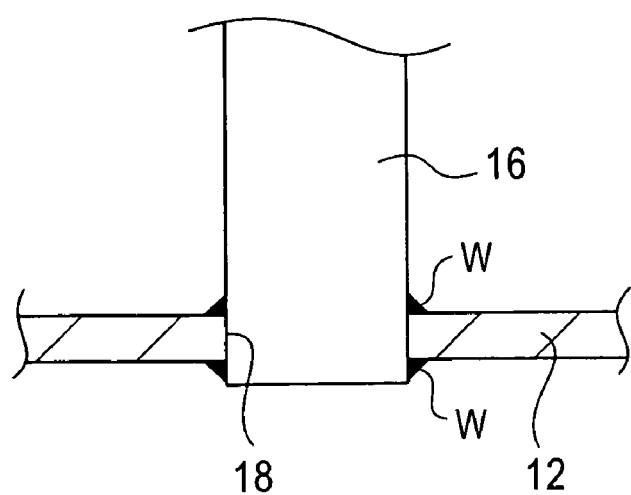
FIG. 2 is a partially enlarged view of FIG. 1.
Figure 3C:
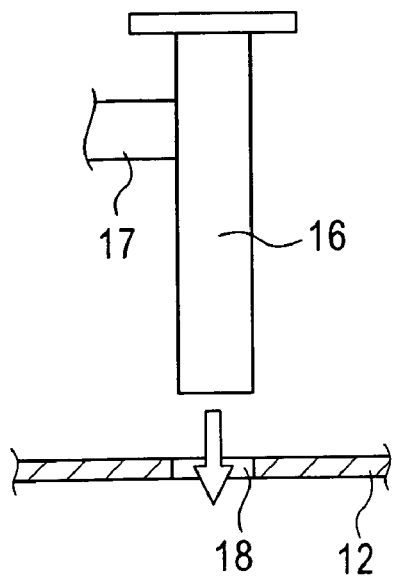
Figure 3D:
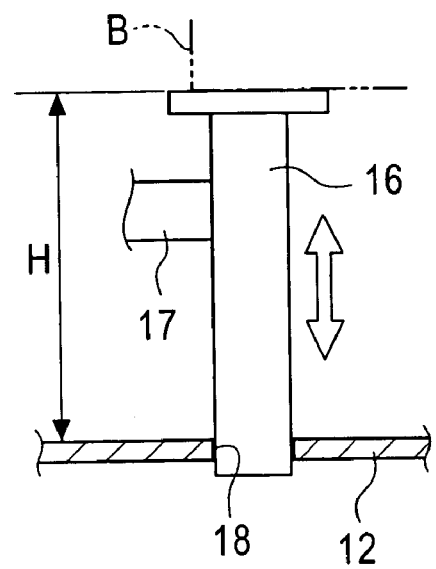

Referring to FIG. 3C, the lower end of the supporter 16 is then inserted through the attachment hole 18 from above. Referring to FIG. 3D, the supporter 16 is then adjusted to a height H. Subsequently, as shown in FIGS. 1 and 2, the engagement portion between the supporter 16 and the attachment hole 18 (normally, at both sides of the bottom plate 12) is welded.

Referring to FIG. 3D, during the adjustment step of the supporter 16 to height H, the height H of the supporter 16 may be adjusted in situ with respect to a provisional positioning of a corresponding one of elements B.

Accordingly, the attachment hole 18 is formed perpendicular to the bottom plate 12, and the lower end of the supporter 16, i.e. the perpendicular member, is welded to the bottom plate 12 while being engaged with the attachment hole 18. Thus, the perpendicularity of the supporter 16 is achieved regardless of the presence of welding distortion or a fabrication error in the bottom plate 12, or a truncation error in the supporter 16.

Furthermore, as mentioned above, since the height of each supporter 16 can be freely adjusted, a proper height setting of each supporter 16 can be achieved.

Moreover, since each attachment hole 18 is formed by machining the inner periphery of the corresponding preliminary hole 18a perpendicular to the bottom plate 12, the perpendicularity of each supporter 16 can be accurately controlled.

Furthermore, as described above, the lower end of each supporter 16 is welded to the bottom plate 12 while being completely inserted through and engaged with the corresponding attachment hole 18. This structure strengthens the connection between each supporter 16 and the bottom plate 12, especially when the thickness of the bottom plate 12 is small. Moreover, the structure also provides higher adjustability for the height H of the supporters 16.

Figure 4:
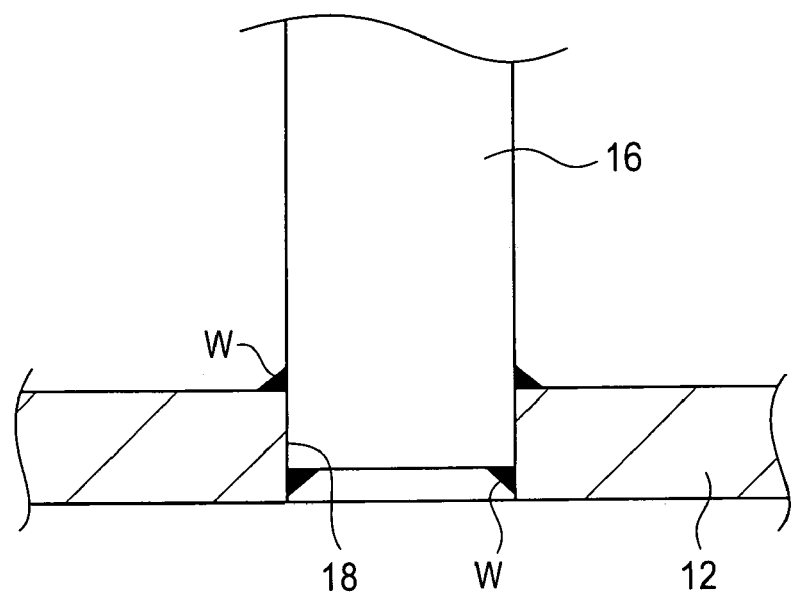
FIG. 4 is a partially enlarged cross-sectional view illustrating a state where one of the supporters is fixed to the bottom plate of the upper frame according to a second embodiment of the present invention, FIG. 4 corresponding to FIG. 2.
Figure 5:
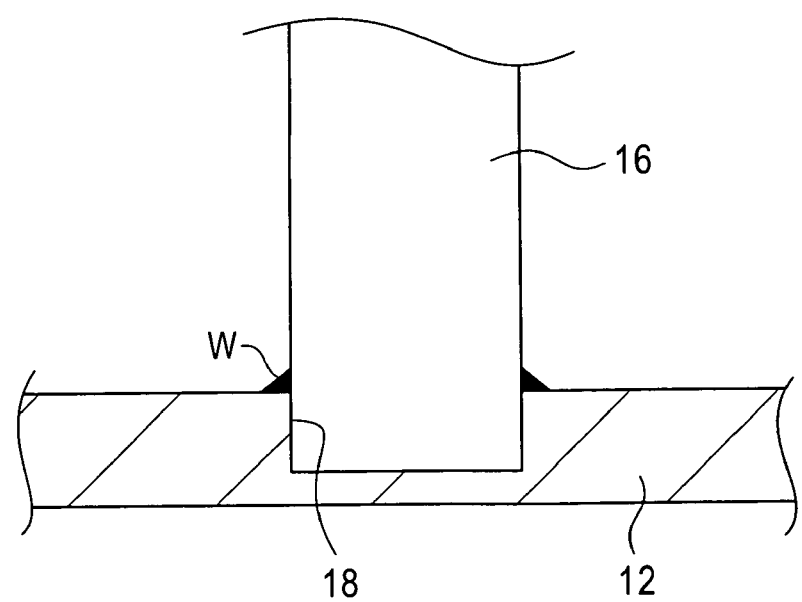
FIG. 5 is a partially enlarged cross-sectional view illustrating a state where one of the supporters is fixed to the bottom plate of the upper frame according to a third embodiment of the present invention, FIG. 5 corresponding to FIG. 2.

Second and Third Embodiments (FIGS. 4 and 5)

Second and third embodiments of the present invention will be described by only pointing out the differences from the first embodiment.

FIG. 4 corresponds to the second embodiment. Referring to FIG. 4, the lower end of each supporter 16 is engaged with the corresponding attachment hole 18 in an incompletely inserted state. After the height H of one of the supporters 16 is adjusted within the attachment hole 18, the supporter 16 is welded to the bottom plate 12. The reference characters W indicate the welded portions.

FIG. 5 corresponds to the third embodiment. Referring to FIG. 5, each attachment hole 18 in the third embodiment does not extend completely through the bottom plate 12. After the height H of one of the supporters 16 is adjusted within the attachment hole 18, the supporter 16 is welded to the bottom plate 12.

According to the second and third embodiments, the lower end of each supporter 16 is welded to the bottom plate 12 while the supporter 16 is engaged with the corresponding attachment hole 18 in an incompletely inserted state. Consequently, this reduces the area of the inner periphery of the attachment hole 18 that needs to be machined, especially when the thickness of the bottom plate 12 is large. This improves the operational efficiency for manufacture.

Furthermore, the structure of the third embodiment suppresses strength reduction of the bottom plate 12 since each attachment hole 18 does not completely extend through the bottom plate 12.

Figure 6:
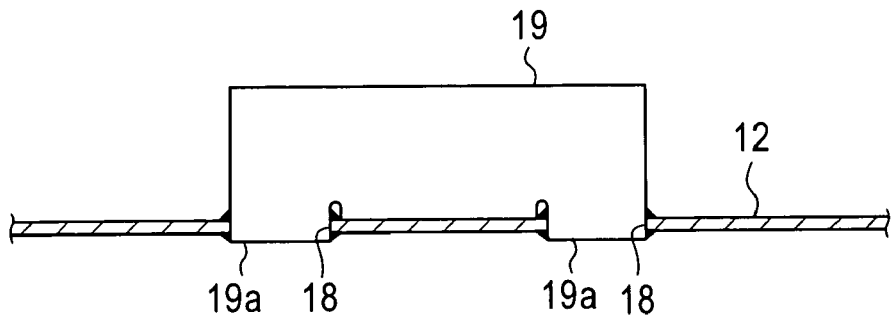
FIG. 6 is a cross-sectional view illustrating a state where one of plate members acting as the perpendicular member is fixed to the bottom plate of the upper frame according to a fourth embodiment of the present invention, FIG. 6 corresponding to FIG. 2.

Fourth Embodiment (FIG. 6)

A fourth embodiment according to the present invention will now be described with reference to FIG. 6. In the fourth embodiment, the perpendicular member mentioned above is a plate member 19 having a relatively oblong structure.

In other words, the bottom edge of each of the plate members 19 is provided with insertion segments 19a (two insertion segments 19a are provided in FIG. 6) which protrude downward from the plate member 19. The insertion segments 19a are separated by a predetermined distance in the longitudinal direction of the plate member 19. On the other hand, the bottom plate 12 is provided with the attachment holes 18 at positions corresponding to the insertion segments 19a. Each of the insertion segments 19a is welded to the bottom plate 12 while being engaged with the corresponding attachment hole 18.

Consequently, in comparison with a case where an attachment slot corresponding to the overall length of each oblong plate member 19 is provided in the bottom plate 12, the structure according to the fourth embodiment reduces the area of the inner periphery of the attachment hole 18 that needs to be machined since the insertion segments 19a of each plate member 19 engage with the corresponding attachment holes 18. Moreover, this structure of the fourth embodiment suppresses strength reduction of the bottom plate 12.

Figure 7A:
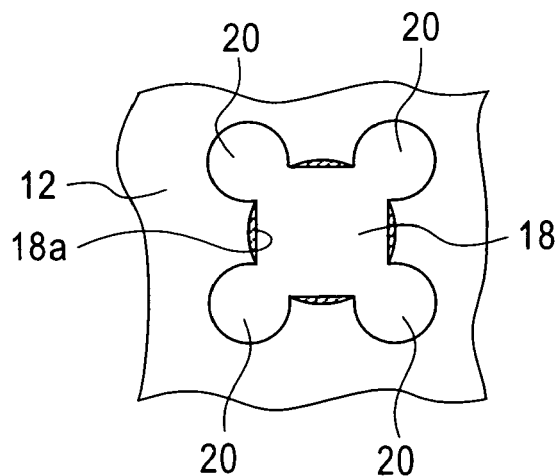
FIGS. 7A to 7C are plan views each illustrating an alternative structure of one of attachment holes according to a corresponding one of alternative embodiments of the present invention.
Figure 7B:
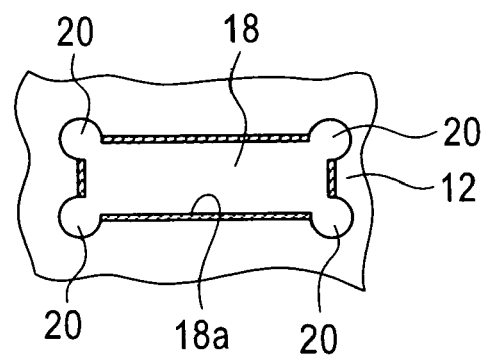
Figure 7C:
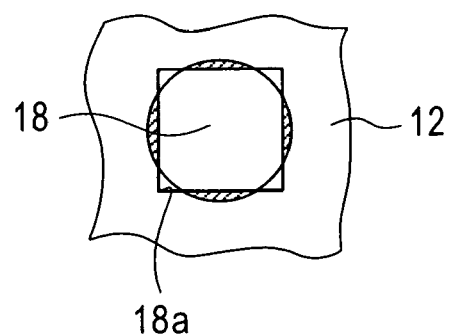

Alternative Embodiments (FIGS. 7A to 7C)

Referring to FIG. 7A, each of the attachment holes 18 in the bottom plate 12 may have an alternative structure. In detail, for forming one of the alternative attachment holes 18, a rectangular preliminary hole 18a having clearance-hole components 20 at the four corners of the rectangle is formed in the bottom plate 12. Subsequently, each portion of the inner periphery of the preliminary hole 18a between adjacent clearance-hole components 20 (indicated by slant lines) is machined perpendicular to the bottom plate 12 such that the portion is arc-shaped in plan view. Thus, the lower end of a perpendicular member having a circular cross-section can be engaged with the corresponding attachment hole 18.

Furthermore, referring to FIG. 7B, each of the attachment holes 18 may have an alternative structure. In detail, for forming one of the alternative attachment holes 18, a rectangular preliminary hole 18a having clearance-hole components 20 is formed. Specifically, each portion of the inner periphery between adjacent clearance-hole components 20 is machined perpendicular to the bottom plate 12 such that the portion is linear in plan view. Accordingly, the lower end of a perpendicular member having a rectangular cross-section can be engaged with the corresponding attachment hole 18.

According to these alternative embodiments, the area of the inner periphery of each attachment hole 18 that needs to be machined is reduced. This improves the operational efficiency for manufacture. Furthermore, according to the embodiment of FIG. 7B, the clearance-hole components 20 provided at the four corners of each rectangular attachment hole 18 prevent the four corners of each perpendicular member having a rectangular cross-section from being rounded. Consequently, attachment holes that fit with the perpendicular members having a rectangular cross-section can be obtained, thus improving the perpendicularity.

Furthermore, referring to FIG. 7C, another alternative structure is possible for the attachment holes 18. In detail, after forming each rectangular preliminary hole 18a, a portion of each side of the inner periphery of the preliminary hole 18a may be machined such that each portion is arc-shaped in plan view. Each of these arc-shaped portions corresponds to the outer periphery of a perpendicular member having a circular cross-section. Thus, the lower end of the perpendicular member having a circular cross-section can be engaged with the corresponding attachment hole 18.

In comparison with a case where circular preliminary holes are formed and the entire inner periphery of each preliminary hole is machined, the structure described above reduces the area of the inner periphery of each attachment hole 18 that needs to be machined. This improves the operational efficiency for manufacture. Moreover, in a case where multiple portions of the outer periphery of each perpendicular member having a circular cross-section are tap-welded to the bottom plate 12, the arc-shaped portions of each attachment hole 18 may function as designated welding positions. This achieves a proper horizontal setting of each perpendicular member.

Although the invention has been described with reference to the preferred embodiments in the attached figures, it is to be noted that equivalents may be employed and substitutions made herein without departing from the scope of the invention as recited in the claims.

We claim:

1. A construction machine comprising:

a lower traveling body;

an upper rotating body rotatably disposed on the lower traveling body, the upper rotating body including an upper frame with a bottom plate having a machined attachment hole, an inner periphery of which is machined so as to be substantially perpendicular to the bottom plate and extends substantially perpendicular to the bottom plate; and a perpendicular member comprising a supporter for supporting an element at a certain distance above the bottom plate, wherein said supporter is disposed on the bottom plate in such a manner that a lower end of the supporter is welded substantially perpendicular to the bottom plate while being engaged with said bottom plate at said machined attachment hole, wherein said attachment hole extends completely through the bottom plate, a lower end of the supporter being welded to the bottom plate while being completely inserted through and engaged with said attachment hole, whereby the height of the perpendicular member can be adjusted.

2. A construction machine comprising:

a lower traveling body;

an upper rotating body rotatably disposed on the lower traveling body, the upper rotating body including an upper frame with a bottom plate having an attachment hole which extends substantially perpendicular to the bottom plate; and a perpendicular member disposed on the bottom plate in such a manner that an end of the perpendicular member is welded substantially perpendicular to the bottom plate while being engaged with said attachment hole, wherein the perpendicular member has a plate structure having a plurality of insertion segments protruding downward from the perpendicular member, the insertion segments being separated by a predetermined distance, and wherein said attachment hole comprises a plurality of insertion segment attachment holes, each of said insertion segment attachment holes being provided at a position corresponding to one of the insertion segments, and the insertion segments being-disposed on the bottom plate in such a manner that an end of each of the insertion segments is welded to the bottom plate while the insertion segments are engaged with the corresponding insertion segments attachment holes.

* * * * *